United States Patent Office 3,476,408
Patented Nov. 4, 1969

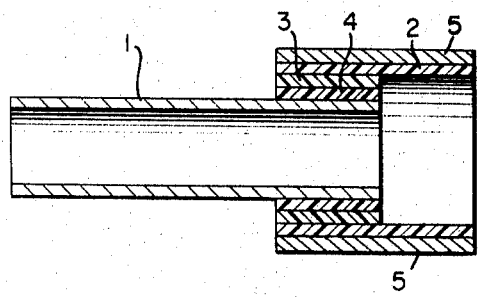

3,476,408
TRANSITION FITTINGS
Kenneth R. Wolfe, Marietta, Ohio, assignor to E. I. du Pont de Nemours and Company, Wilmington, Del., a corporation of Delaware
Filed Oct. 28, 1966, Ser. No. 590,424
Int. Cl. F16l *13/02, 35/00, 47/02, 55/00*
U.S. Cl. 285—21         11 Claims

ABSTRACT OF THE DISCLOSURE

A transition fitting for joining metallic to thermoplastic pipe having concentrically disposed layers of (1) a metallic pipe, (2) an epoxy enamel on the surface of the metallic pipe, (3) a layer of specified adhesive polymer over the epoxy enamel and (4) a thermoplastic pipe fused to the layer of adhesive copolymer.

---

This invention relates to pipe, and, more particularly, to transition fittings for joining metallic pipe to thermoplastic pipe.

The joining of thermoplastic pipe directly to metallic pipe presents problems due to the variation in physical properties of metallic and thermoplastic pipe. This problem is especially acute with hydrocarbon polymers such as polyethylene, due to creep or cold-flow properties thereof.

As used herein, the term "coupling" refers to tubular structures which fit over the outside of a length of pipe in a transition fitting. The term "tubular structure" is generic to both such couplings and to pipe, and hence is used herein to describe both coupling and pipe.

This invention provides a transition fitting in which a thermoplastic tubular structure is actually bonded in a physico-chemical manner to a metallic tubular structure. A thermoplastic pipe system can thus be joined to a metallic pipe system through such a transition fitting. The bond of the thermoplastic tubular structure to the metallic tubular structure in this transition fitting can be strong as, and frequently stronger than, the thermoplastic pipe itself. The transition fitting of this invention has good resistance to corrosion. This invention also provides a process for making such transition fittings.

In the transition fitting of this invention, a thermoplastic pipe can be bonded inside a metallic coupling, or the metallic pipe bonded inside a thermoplastic coupling.

A more complete understanding of the present invention may be had by reference to the drawing attached hereto and made a part of the specification, wherein there is shown a cross-section of the transition fitting of this invention, i.e., a tubular structure 1 bonded through intermediate layers 3 and 4 (described below) to tubular structure 2, wherein either 1 or 2 is metallic and the other thermoplastic. The thicknesses of 3 and 4 are exaggerated beyond the normal thickness for clarity. Optionally a third tubular structure or sleeve 5 usually constructed of metal is provided to stiffen the transition fitting.

The transition fitting of this invention comprises the following series of successive concentrically-disposed, co-extensive layers: a metallic tubular structure, a layer of epoxy enamel on the mating surface of the metallic tubular structure, a fused layer of adhesive copolymer over the layer of epoxy enamel, and a thermoplastic tubular structure fused to the layer of adhesive copolymer. The term "adhesive copolymer" is defined below.

The thermoplastic tubular structure used in the transition fitting of this invention (and hence the thermoplastic pipe which can be bound to metallic pipe by the transition fitting of this invention) can be of a variety of compositions. Illustrative of such thermoplastic materials are polyvinyl chloride, acrylonitrile-butadiene-styrene (ABS), cellulose acetate butyrate, polyolefins, and acetal resins.

The transition fittings of the present invention are especially useful with polyolefins such as polyethylene, polypropylene, polybutylene, and copolymers of ethylene/propylene, due to their mechanical properties. A very important application of this invention is in bonding metallic pipe to pipe of medium density polyethylene. Medium density polyethylene is defined as that having a density in the range 0.926–0.940, preferably about 0.934, and a melt index in the range 1.5–2.3, preferably about 1.9.

The composition of the metallic tubular structure in the transition fittings of this invention can be varied widely. For example, steel, iron, copper, and aluminum-nickel alloys may be employed. Black steel is most commonly used in such pipe systems.

The epoxy enamel layer in the present invention is employed, among other reasons, to prevent oxidation of the metallic tubular structure after it is cleaned and to prevent corrosion thereof during use of the transition fitting. Illustrative of such epoxy enamels is Du Pont "Corlar" epoxy enamel, a fast-drying enamel consisting of a pigmented epoxy resin and a polyamide activator.

The adhesive copolymer employed in this invention is a copolymer of ethylene and $\alpha,\beta$-ethylenically unsaturated carboxylic acids and is prepared according to commonly owned U.S. application Ser. No. 349,759, filed Mar. 5, 1964 by J. B. Armitage, which is a continuation-in-part of application Ser. No. 119,265, filed June 26, 1961, now abandoned. The $\alpha,\beta$-ethylenically unsaturated carboxylic acid monomers are those containing 3–8 carbon atoms. In the copolymer the carboxylic acids are randomly distributed over the copolymer molecules, and in the copolymer (1) the ethylene content is at least 50 mole percent based upon the acid copolymer, (2) the unsaturated carboxylic acid content is 0.2–25 mole percent based upon the acid copolymer, and (3) one or more other monomer components optionally copolymerized in said copolymer are monoethylenically unsaturated.

Not only is the above-described "acid" copolymer useful in the transition fittings of the present invention, but also the "ionic" copolymer formed therefrom by ionization by metal ions of some of the carboxylic acid functions of the acid copolymer. Such ionic copolymers are described broadly in U.S. Patent 3,264,272, issued to R. W. Rees on Aug. 2, 1966. For use in the transition fittings of the present invention, however, there is an upper limit upon the metal ion content of the ionic copolymer. Namely, there should not be present more than that amount of metal ion necessary to ionize, on a stoichiometric basis, about 50% of the carboxylic acid groups of the acid copolymer. When it is said herein that a given percent of the carboxylic acid groups of an acid copolymer are ionized by metal ions, it is meant that there is present a sufficient quantity of metal ion to ionize that percentage of the carboxylic acid groups on a stoichiometric basis, but it is not implied that every metal ion, or every valence of a multi-valent metal ion, has been effective in ionizing a carboxylic acid group.

The preferred copolymer used in this invention is a copolymer of ethylene and methacrylic acid, comprising 80–97 mole percent ethylene and 3–20 mole percent methacrylic acid. The optimum mole percentage of methacrylic acid in that copolymer is in the range of about 3–7 mole percent. When metal ions have been added to the acid copolymer to form an ionic copolymer, as described above, the preferred metal ion is $Zn^{+2}$, and the preferred amount of $Zn^{+2}$ is an amount equivalent to up to 30% of the carboxylic acid groups present. The amount of free acid groups present seems to influence the degree of adhesion by the copolymer. Hence, for copolymers with a low mole percentage of acid groups, a lower percentage ionization would be preferred.

In the present invention the preferred adhesive copolymer is the acid, rather than the ionic, copolymer.

The fusion length (i.e., the length for which the thermoplastic and metallic tubular structures in the transition fitting are bonded to one another through coextensive layers as described herein) can be varied, and is dependent upon a number of factors, such as diameter of thermoplastic and metallic tubular structures, thickness of the layers of epoxy enamel and adhesive copolymer, etc. For example, for a ¾-inch diameter fitting, a fusion length of about 1 inch is desirable, and for a 3-inch diameter fitting, a fusion length of about 2 inches is preferred.

The thicknesses of the intermediate layers of epoxy enamel and adhesive copolymer in the transition fittings can be varied widely, as indicated herein. In actual practice, the maximum thickness of each of these layers would be much less than the wall thickness of either of the tubular structures employed in the fitting, and would be limited by that wall thickness.

In the transition fitting of this invention, a thermoplastic pipe can be bonded inside a metallic coupling, or vice versa. In either case, the order of layers in the transition fitting is metallic tubular structure, epoxy enamel, adhesive copolymer, then thermoplastic tubular structure.

It is understood that one skilled in the art would place the coextensive layers of this fitting at or near the end of the tubular structures employed in the manufacture of these fittings. Should it be desirable to locate these bonded coextensive layers of the fitting in the middle of a length of tubular structure to provide substantial overlapping of unbonded areas of the tubular structures, this modification would be expressly within the purview of this invention.

The transition fittings of this invention can be produced according to a general process comprising the following steps. First, burs are removed from the mating surface of the metallic tubular structure, then the surface is cleaned. Cleaning can be accomplished abrasively or chemically. Then the cleaned surface of that end of the length of tubular structure to be employed in the transition bond is coated with epoxy enamel. This step should be completed shortly after the cleaning step to minimize oxidation of the cleaned surface. The epoxy enamel layer may optionally then be cured at elevated temperature.

A layer of adhesive copolymer is then applied over the layer of epoxy enamel. (It may be desirable to degrease the surface of the enamel, as, for example, with an organic solvent such as a liquid fluorocarbon, prior to the application of the adhesive copolymer.) The adhesive copolymer can be applied, for example, by dipping the enamel-coated tubular structure into molten adhesive copolymer, or a tape or film of the adhesive copolymer can be applied over the epoxy enamel layer, then fused thereto. The thermoplastic tubular structure is then fused to the adhesive copolymer layer by melting the mating surfaces of the adhesive copolymer and the thermoplastic tubular structure, then placing them in intimate contact with one another and allowing them to solidify.

A preferred process for making transition fittings of medium density polyethylene and steel according to this invention comprises the following steps, wherein a transition fitting in which the inner tubular structure is a steel pipe is illustrated.

Burs are removed from the surface of the steel pipe to be employed in the transition fitting. The surface of the steel pipe is then sand blasted and washed with an organic solvent to remove grit. Then, immediately or within a few hours, a layer of Du Pont "Corlar" epoxy enamel is applied onto the surface of the steel pipe. The layer of epoxy enamel should be at least 0.5 mil thick, preferably about 2 mils nominal thickness.

Adhesive copolymer tape about 10 mils thick is then wound around the end of the epoxy-enamel-coated pipe. The number of wraps can be varied and is preferably about five, i.e., the layer of adhesive copolymer is about 50 mils thick. The length of the adhesive copolymer layer, and hence the maximum fusion length of the transition fitting, varies with the diameter of the tubular structures of the fitting, as discussed above. The steel pipe coated with epoxy enamel and adhesive copolymer is then heated in an air oven at 175° C. for about 0.5–3 hours to fuse the adhesive copolymer layer into a uniform homogeneous layer.

The coated metallic pipe and the thermoplastic coupling are then mated and clamped in a hot tool for a period of time dependent upon the diameter of the tubular structures (a 1-inch diameter transition fitting, for example, was heated at 580° F. for 6–8 seconds). The fused transition fitting is then allowed to cool over a period of about a minute or two.

A steel reinforcing sleeve can optionally be pressed over the fitting using a mechanical or hydraulic assist.

The following examples are presented to illustrate, but not to restrict, the present invention. Percentages and parts are expressed by weight unless otherwise noted.

In the example below, the following were the adhesive copolymers employed. The *acid* copolymer referred to was a copolymer of ethylene/methacrylic acid containing 3.1 mole percent of the acid and having a melt index of 10. The *ionic* copolymer referred to was a copolymer of ethylene/methacrylic acid comprising 4.3 mole percent methacrylic acid, also containing sufficient $Zn^{+2}$ to ionize about 20% of the carboxylic acid groups present. The ionic copolymer had a melt index of 1.5.

The thermoplastic tubular structure was of medium density polyethylene, having a density of 0.940 and a melt index of 1.9. The metallic pipe employed in the examples was galvanized steel. The pipe was debured and cleaned before use in the transition fittings.

The epoxy enamel employed in the examples was Du Pont "Corlar" polyamide-activated epoxy enamel.

The thickness of the layers of epoxy enamel and adhesive copolymer are thickness before fusion, and hence are nominal, since thickness can vary during the fusion operation.

The following physical tests were used in the examples below. Long-term burst strength was determined by ASTM Method D1598–63T. Short-term burst strength was determined by ASTM Method D1599–62T.

The hot water accelerated corrosion test was conducted as follows. Approximately 10 inches of polyethylene pipe was fused to a polyethylene coupling of a transition fitting. An end cap with a pressure tap was then joined to the open end of the thermoplastic pipe. A metal end cap was fastened to the metal pipe side of the transition fitting. The sample was then pressure tested under a hydrostatic pressure of 120 p.s.i.g. using the procedure of ASTM Method D1599–62T. The apparatus was then placed in a constant temperature bath at about 190° F., and was periodically removed for pressure testing at 120 p.s.i.g.

Tensile strength was determined as follows. About 10 inches of polyethylene pipe was connected to the polyethylene coupling of a transition fitting. An end cap or coupling was then fastened or fused to the open ends of the pipes as appropriate. A sample was then pulled on a standard Instron tensile testing machine at a jaw separation rate of 0.2 inch per minute till failure.

The salt spray test was conducted with the apparatus described in ASTM Method D117–61, by exposing the sample for 1,000 hours to a 5% salt solution held at 100° F. The sample was then removed and pressure tested according to ASTM Method D1599–62T.

Example I

The transition fitting employed herein was fused from the following concentric layers, listed from inner to outer: a 12-inch length of nominal ¾-inch IPS galvanized steel pipe (O.D. 1.050 inches; I.D., 0.824 inch); a 12-mil layer of spoxy enamel; a 30-mil layer of the *acid* adhesive copolymer; a 5-inch length of polyethylene coupling (O.D., 1.385 inches; I.D., 1.027 inches machined at the mating end to 1.092 inches); a steel sleeve about 4 inches long. The fusion length was 3 inches.

An 8-inch length of nominal ¾-inch polyethylene pipe (O.D., 1.050 inches; I.D., 0.860 inch) was attached and the assembly was subjected to the hot water accelerated corrosion test described above. No failure had occurred after 4 months on weekly pressure testing at 120 p.s.i.g.

Example II

The transition fitting employed herein comprised: a 6-inch length of 2-inch IPS steel pipe; a 12-mil layer of epoxy enamel; a 40-mil layer of the *acid* adhesive copolymer; a 4½-inch length of 2-inch polyethylene coupling (O.D., 3.015 inches, machined I.D. at the mating end 2.417 inches); a steel sleeve of 3¼-inch steel tubing, 2 5/16 inches long, I.D. 3.010 inches. The fusion length was about 2.5 inches.

Polyethylene pipe (2-inch IPS) was fused to the polyethylene coupling. Under the tensile strength test described above, the polyethylene pipe itself failed at 3230 pounds, while the transition fitting remained intact.

Example III

The transition fitting employed herein comprised: a 12-inch length of ¾-inch IPS steel pipe as in Example I; a 2-mil layer of epoxy enamel; a 50-mil layer of *ionic* adhesive copolymer; a 4-inch length of ¾-inch polyethylene coupling as in Example I; a steel sleeve of 1½-inch steel tubing about 4 inches long. The fusion length was about 3 inches.

Under a long-term burst strength test described above, no failure occurred for 9 months at room temperature and 75 p.s.i.g.

Example IV

The transition fitting employed herein comprised: a 12-inch length of 3-inch IPS steel pipe; a 2-mil layer of epoxy enamel; a 50-mil layer of *ionic* adhesive copolymer; a 2⅝-inch length of polyethylene coupling (I.D., 3.458 inches, machined to 3.558 inches at the mating end); a 2⅝-inch length of 4½-inch steel tubing as a sleeve. The fusion length was about 2 inches.

A 2-foot length of 3-inch IPS polyethylene pipe was fused to the thermoplastic end of the transition fitting. The free end of the 2-foot pipe was fitted with a 90° elbow, and an additional 2-foot length 3f polyethylene pipe fused to the elbow, making a right angle to the centerline of the transition fitting. The end of the second 2-foot length of pipe was fitted with an end cap containing a pressure gage. The steel end of the transition fitting was clamped in a vice so that the transition fitting, the 2 feet of pipe attached thereto, and the additional 2 feet of pipe attached to the first length of pipe by the 90° elbow, were all in the horizontal plane. The steel end was then equipped with a pressuring device.

A 50-pound weight was hung at the end of the 2-foot section of pipe which was at a 90° angle to the transition fitting centerline. The load thus subjected the transition fitting to both bending and twisting forces. The assembly was pressurized internally with *air* to 60 p.s.i.g. No loss of pressure occurred during 4 months.

Example V

Two transition fittings were employed herein, both identical to that of Example III.

One was subjected to the salt-spray test described above. Then both were subjected to the short-term burst strength test described above, i.e., each sample was held at 200 p.s.i.g. and 73° F. Then the pressure was raised rapidly (within 1 minute). In each sample the plastic pipe section burst at 590 p.s.i.g. The bonded area of the transition fitting remained sound even though the steel portion of the fitting had corroded somewhat.

Example VI

The transition fitting employed herein was fused from the following concentric layers: a 12-inch length of ¾-inch IPS steel pipe, which had been plated with about a a 0.2-mil layer of cadmium; a 12-mil layer of epoxy enamel; a 40-mil layer of *acid* adhesive polymer; a 5-inch length of polyethylene coupling, a 4-inch long 1½-inch steel sleeve. The fusion length was about 3 inches. An 8-inch length of ¾-inch polyethylene pipe was fused to the polyethylene coupling. The assembly was then closed at each end. In the long-term burst strength test mentioned above, after 6120 hours of continuous pressure at 300 p.s.i.g. and 73° F., polyethylene pipe failed by splitting, while the bonded area of the transition fitting remained intact.

Example VII

The transition fitting employed herein was identical to that of Example III, except that the steel sleeve was omitted.

An 8-inch length of ¾-inch polyethylene pipe was fused to the polyethylene coupling and the assembly was held at an internal pressure of 120 p.s.i.g. while immersed in a water bath held at 140° F. The transition fitting was intact after 500 hours.

The transition fitting of this invention has excellent strength, as seen in the examples, wherein it is shown that the thermoplastic pipe failed under pressure while the transition fitting itself remained intact.

The process of this invention is easily adapted to produce transition fittings wherein the inner tubular structure is thermoplastic pipe and the outer tubular structure is metallic coupling, or vice versa. When the outer tubular structure is thermoplastic coupling, it may be desirable to further stiffen the fitting with a sleeve of high-modulus material. Such a sleeve can be pressed onto the transition fitting. The high-modulus material employed in the sleeve can be selected from a number of materials such as high-modulus metals, rigid polyvinyl chloride, and polyoxymethylenes. The preferred sleeve composition is steel.

The transition fittings of the present invention are useful in any system where it is desirable or necessary to employ both thermoplastic and metallic pipe. An example is gas distribution systems. Natural gas distribution systems were conventionally made of metallic pipe (steel), whereas thermoplastic pipe has now been found to be useful. Hence, transition fittings are used in connecting a metallic gas main to thermoplastic pipe used in distributing gas through a subdivision.

The foregoing detailed description has been given for clearness of understanding. The invention is not limited to the exact details shown and described since obvious modifications will occur to those skilled in the art.

What is claimed is:

1. A transition fiting for joining metallic pipe to thermoplastic pipe, which comprises the following successive concentrically-disposed, coextensive layers:
   (a) a metallic tubular structure,
   (b) a layer of epoxy enamel bonded to the surface of said metallic tubular structure,
   (c) a fused layer of adhesive copolymer bonded to said layer of epoxy enamel,
   (d) a thermoplastic tubular structure bonded to said layer of adhesive copolymer, said adhesive copolymer being a copolymer of ethylene and $\alpha,\beta$-ethylenically unsaturated carboxylic acid of 3–8 carbon atoms, said carboxylic acids being randomly distributed over all the copolymer molecules, and in the copolymer (1) the ethylene content is at least 50 mole percent based upon the acid copolymer, (2) the unsaturated carboxylic acid content is 0.25–25 mole percent based upon the acid copolymer, and (3) one or more other monomer components optionally copolymerized in said copolymer are monoethylenically unsaturated, optionally there being present in said copolymer an amount of metal ions equivalent to up to 50% of the carboxylic acid groups of said copolymer.

2. A transition fitting according to claim 1 wherein the thermoplastic is a hydrocarbon polymer selected from the class consisting of polyethylene, polypropylene, polybutylene, and copolymers of ethylene/propylene.

3. A transition fitting according to claim 1 comprising an inner tubular structure of metallic pipe and an outer tubular structure of thermoplastic coupling, which additionally comprises a third tubular structure composed of a high-modulus material, as a sleeve around the outside of the transition fitting engaging at least a portion of said coupling, whereby said transition fitting is stiffened.

4. A transition fitting according to claim 3 wherein said high-modulus material is a metal.

5. A transition fitting according to claim 1 wherein said adhesive copolymer is a copolymer of ethylene and methacrylic acid, comprising 80–97 mole percent ethylene.

6. A transition fitting for joining steel pipe to medium density polyethylene pipe which comprises the following successive concentrically-disposed, coextensive layers:
  (a) a steel tubular structure having a clean surface in the area to be mated in said fitting,
  (b) a layer of epoxy enamel bonded to said steel tubular structure, the layer of epoxy enamel being at least 0.5 mil thick,
  (c) a fused layer of adhesive copolymer, at least 10 mils thick, bonded to said layer of epoxy enamel, and
  (d) a polyethylene tubular structure bonded to the layer of said adhesive copolymer, said adhesive copolymer being a copolymer of ethylene and methacrylic acid, comprising 80–97 mole percent ethylene, said methacrylic acid being randomly distributed over all copolymer molecules.

7. A transition fitting according to claim 6 comprising an inner tubular structure of steel and an outer tubular structure of polyethylene, which additionally comprises a third tubular structure of high-modulus material as a sleeve around the outside of the transition fitting engaging at least a part of said tubular structure of polyethylene.

8. A transition fitting according to claim 6 wherein the adhesive copolymer contains an amount of zinc ion equivalent to up to 50% of the carboxylic acid groups in the copolymer, on a stoichiometric basis.

9. A process for making a transition fitting for joining metallic pipe to thermoplastic pipe, which comprises:
  (a) applying and bonding a layer of epoxy enamel to the mating surface of a section of metallic tubular structure,
  (b) bonding onto the layer of epoxy enamel a layer of adhesive copolymer,
  (c) mating said layer of adhesive copolymer, when the surface thereof is molten, with a length of thermoplastic tubular structure, the mating surface of which is molten, and
  (d) cooling the thermoplastic tubular structure and said layer of adhesive copolymer thereby forming a bond between said thermoplastic tubular structure and said copolymer, said adhesive copolymer being a copolymer of ethylene and an $\alpha$-$\beta$-ethylenically unsaturated carboxylic acid of 3–8 carbon atoms, said carboxylic acids being randomly distributed over all the copolymer molecules and in the copolymer (1) the ethylene content is at least 50 mole percent based upon the acid copolymer, (2) the unsaturated carboxylic acid content is 0.25–25 mole percent based upon the acid copolymer, and (3) one or more other monomer components optionally copolymerized in said copolymer are monoethylenically unsaturated, said carboxylic acid groups of said copolymer optionally being ionized by up to 50% metal ions to form an ionic copolymer.

10. A process according to claim 9 wherein the inner tubular structure is metallic pipe and the outer tubular structure is thermoplastic coupling, said process additionally comprising placing over said outer tubular structure a third tubular structure of a high-modulus material, whereby the transition fitting is stiffened by engagement of said third tubular structure with said outer tubular structure.

11. A process according to claim 9 wherein said adhesive copolymer is a copolymer of ethylene and methacrylic acid comprising 80–97 mole percent ethylene.

References Cited

UNITED STATES PATENTS

| | | | |
|---|---|---|---|
| 3,035,958 | 5/1962 | Wilkens | 285—423 X |
| 3,152,820 | 10/1964 | Giampa et al. | 285—423 X |
| 3,246,671 | 4/1966 | Stein et al. | 285—291 X |
| 2,517,778 | 8/1950 | Fischer | 285—291 |
| 3,172,934 | 3/1965 | Krieg | 285—291 |

FOREIGN PATENTS

| | | |
|---|---|---|
| 718,350 | 11/1954 | Great Britain. |
| 846,357 | 8/1960 | Great Britain. |
| 963,380 | 7/1964 | Great Britain. |

DAVID J. WILLIAMOWSKY, Primary Examiner

DAVE W. AROLA, Assistant Examiner

U.S. Cl. X.R.

156—294; 285—256, 423